United States Patent [19]

Brand

[11] Patent Number: 5,001,933
[45] Date of Patent: Mar. 26, 1991

[54] MICROMECHANICAL VIBRATION SENSOR

[75] Inventor: John H. Brand, Harford County, Md.

[73] Assignee: The United States of America as represented by the Secretary of the Army, Washington, D.C.

[21] Appl. No.: 457,045

[22] Filed: Dec. 26, 1989

[51] Int. Cl.$^5$ ............................................. G01D 21/00
[52] U.S. Cl. .............................. 73/651; 200/61.45 R; 200/61.51; 200/61.48; 200/181
[58] Field of Search ..................... 200/61.45 R, 61.48, 200/61.51, 181; 73/651, DIG. 1, 579; 340/682, 683

[56] References Cited

U.S. PATENT DOCUMENTS

| | | | |
|---|---|---|---|
| 3,413,497 | 11/1968 | Atalla | 200/181 |
| 3,686,593 | 8/1972 | Zakaria | 200/181 |
| 4,479,389 | 10/1984 | Anderson | 73/651 |
| 4,543,457 | 9/1985 | Petersen et al. | 200/61.45 R |
| 4,673,777 | 6/1987 | Bai et al. | 200/61.48 |
| 4,729,239 | 3/1988 | Gordon | 73/593 |
| 4,740,410 | 4/1988 | Muller et al. | 428/133 |
| 4,855,544 | 8/1989 | Glenn | 200/61.45 R |
| 4,873,871 | 10/1989 | Bai et al. | 73/777 |
| 4,891,984 | 1/1990 | Fujii et al. | 73/651 |

OTHER PUBLICATIONS

Micromachine Magic, *Popular Science*, Mar. 1989, pp. 88-92.

Primary Examiner—Hezron E. Williams
Assistant Examiner—Rose M. Finley
Attorney, Agent, or Firm—Saul Elbaum; Paul S. Clohan

[57] ABSTRACT

The bearing failure sensor includes a micromachined mechanical resonator with a conductive cantilevered beam mounted on a conventional insulating substrate to form a microchip. A conductive contact is mounted in close proximity to the free end of the conductive beam to form a gap. An integrated circuit is connected between the fixed end of the beam and the conductive contact. The microchip is mounted on a vibrating machine to be monitored. When vibrations having a given frequency and magnitude occur, the free end will vibrate and move sufficiently to close the gap completing a circuit and causing currents to flow that are detectable by the integrated circuit. Multiple resonators, having different gap sizes and natural resonant frequencies, may also be mounted on a single substrate to monitor vibrations at a plurality of different frequency and amplitude thresholds.

5 Claims, 2 Drawing Sheets

MICROMECHANICAL VIBRATION SENSOR

The invention described herein may be manufactured, used, and licensed by or for the Government for governmental purposes without the payment to me of any royalties thereon.

BACKGROUND OF THE INVENTION

1. Field of the Invention

The present invention relates to miniature bearing failure sensors and, more particularly, to micromachined mechanical resonators for sensing vibrations caused by bearing failures.

2. Description of the Prior Art

One of the most critical problems confronting users of rotating machinery has been the early detection of bearing failures well before serious damage to the bearings occur. Those concerned with these problems have employed a variety of devices designed to detect the onset of bearing failures or actual failures by sensing vibrations at peak frequencies corresponding to bearing rotation. More specifically, it has been the general practice to mount on a machine to be monitored one or more mechanical resonators corresponding to a frequency equal to the frequency of passage of ball bearings or roller bearings or gear teeth or like rotating devices. When damage occurs, the bearing or gear teeth create vibrations which are sensed by the mechanical resonators, permitting corrective action to be taken before major mechanical problems develop.

Examples of prior art systems for sensing bearing failures may be found in the following U.S. Pat. Nos.: 4,237,454; 4,089,055; 4,729,239; 4,763,523; 4,528,852; 4,078,434; 4,493,042; 4,479,389; 4,768,380. Although these and other prior art devices have served the purpose, they have not proved entirely satisfactory under all conditions of service for the reason that considerable difficulty has been experienced in developing reliable, low-cost devices that have sufficient sensitivity to detect very small vibrations that occur in the early stages of failure. Also, the prior art devices lack the ability to detect bearing failures in small-scale machines. Still further, even the smallest prior art sensors to date are usually too massive to be used on bearings located in inaccessable areas.

The '239 patent discloses a highly sensitive ball bearing tester for testing miniature bearings. This device includes a test structure that is significantly larger than the bearing being tested. It requires that the miniature bearing under test be isolated from its associated structure and be mounted on the test structure. As such, this ball bearing test structure is not intended for use in monitoring machinery during actual operation.

A typical system which monitors bearings and other rotating equipment while in actual use is disclosed in the '454 patent. The disclosed system which monitors rotating equipment from a central station includes self-contained and self-powered monitors located on each piece of equipment. Each monitor has a fault detector and a transmitter with the ability to signal a local fault conditioned to a central control point. Electrical power in each unit is derived from a tuned mechanical resonator operating at the rotational frequency of the equipment which is driven by the fundamental unbalanced component of machine vibration. The defect detection and transmitter circuitry may be integrated circuits so that the resonator can generate sufficient power to operate the circuitry. The transmitter and the monitor are triggered by a defect signal produced by a vibration signal processing circuitry and transmits to the central station a short duration radio signal that is modulated to uniquely identify the equipment with the default condition. At the central station there is a receiver for all monitor units which determines the location or identity of the malfunctioning equipment. Vibrations are sensed by the mechanical resonator which includes a cantilevered beam having a piezo-crystal attached thereto. Consequently, this monitor includes a relatively large-scale resonator device capable of producing sufficient electrical power to drive the detection and transmission circuitry. Relatively large-scale monitors of this type suffer in that they are not readily adaptable for use in monitoring miniature bearings due to lack of sensitivity. Additionally, the small changes in vibration intensity that occur in the early stages of failure will also go undetected by large-scale monitors also due to the lack of sensitivity. Still further, large, massive resonators cannot be used in many small inaccessable locations. Although there has been a long recognized need for more sensitive bearing failure sensors capable of providing sufficient warning at the onset of bearing failure, no practical prior art system for doing so has yet been devised.

SUMMARY OF THE INVENTION

The general purpose of this invention is to provide a miniature bearing failure sensor which embraces all of the advantages of similarly employed prior art sensors and possesses none of the aforedescribed disadvantages. To attain this, the present invention contemplates a unique micromachined mechanical resonator and associated circuitry fabricated as an integrated-circuit chip whereby vibrations having preselected frequencies and amplitudes indicative of mechanical failures in rotating or cyclic machinery may be readily sensed.

The micromachined resonator may be fabricated in accordance with well known integrated circuit technology such as described in the following publications: Muller et al., U.S. Pat. No. 4,740,410 entitled, "Micromechanical Elements and Methods for their Fabrication"; Robert Gannon, "Micromachine Magic", *Popular Science*, Mar. 1989, pp 88–92, incorporated herein by reference.

More specifically, the present invention includes a micromechanical resonator fabricated as a part of an electrical integrated circuit. The resonator includes a mechanically moveable means for making and breaking a circuit conductor to initiate currents that are detectable by the electrical circuit. The moveable means includes an electrically conductive cantilevered beam that will complete an electrical circuit when sufficiently vibrated with respect to a conductive contact. The natural resonant frequency of the beam and the gap distance between the free end of the beam and the conductive contact are chosen to tune the sensor so that only vibrations of a predetermined magnitude and frequency are detected. A plurality of such resonators tuned to different frequencies and magnitudes are mounted on a common integrated-circuit chip. A logic circuit connected to the various resonators is employed to provide an output signal indicative of the frequency and magnitude levels of the sensed vibrations.

It is, therefore, an object of the present invention to provide a bearing failure sensor of sufficient sensitivity to detect very small vibrations.

Another object of the invention is the provision of a miniature bearing failure sensor that may be early placed in small, inaccessable locations.

A further object of the invention is to provide a micromechanical resonant structure as part of an electrical integrated circuit for sensing vibrations of a predetermined frequency and magnitude level.

A still further object of the invention is the provision of a plurality of micromechanical resonators on an integrated-circuit chip for sensing vibrations at a multiplicity of frequencies and amplitude levels.

Other objects and features of the invention will become apparent to those skilled in the art as the disclosure is made in the following description of preferred embodiments of the invention as illustrated in the accompanying sheets of drawings.

DETAILED DESCRIPTION OF THE PREFERRED EMBODIMENTS

Figure 1:
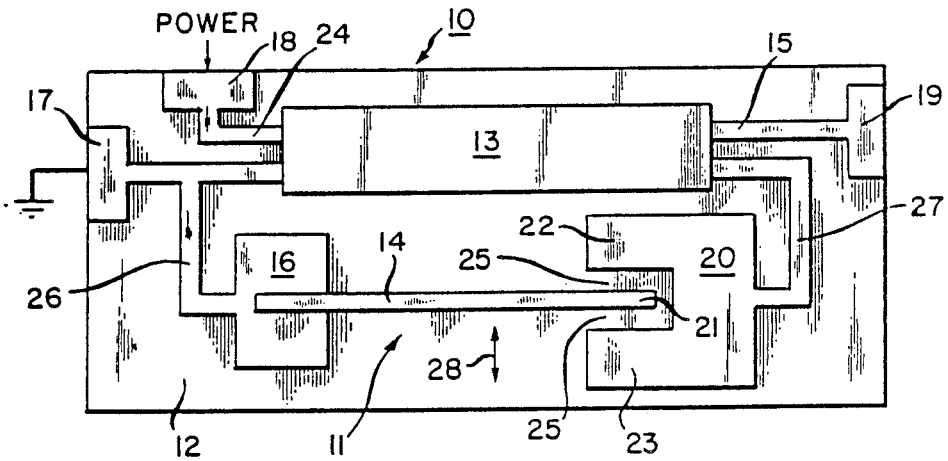
FIG. 1 is a top view of one of the preferred embodiments.
Figure 2:
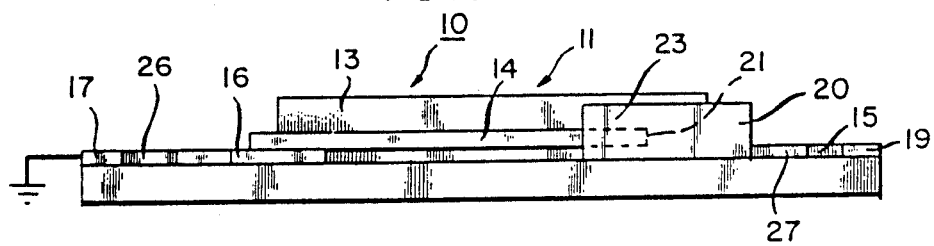
FIG. 2 is a side view of the embodiment shown in FIG. 1.

Referring now to the drawings, there is shown in FIGS. 1 and 2 a chip 10 having a parallel, resonant microstructure 11 mounted on an insulating base or substrate 12. Microstructure 11 includes a mechanical resonator in the form of a cantilevered beam 14 that vibrates in a plane parallel to the surface of the substrate 12. One end of beam 14 is fixed to the surface of a conductive contact 16 that is etched or otherwise deposited on the surface of the substrate 12. Beam 14 is also fabricated of conductive material. A conductive, U-shaped contact 20 is etched or otherwise deposited on the surface of substrate 12 adjacent to free end 21 of beam 14. Contact 20 has a base portion with parallel walls 22, 23 spaced on either side of the free end 21 to form gaps 25. Conductive strips 26, 27, deposited on substrate 12, are connected to contacts 16, 20, respectively, for completing an electrical connection to control circuitry 13. Conductive pads 17, 18, 19 are connected to circuity 13 via conductive strips 26, 24, 15, respectively. Conductive pads 17, 18, 19 form terminal areas for making electrical connections to the chip 10. Electrical power may be connected to pad 18 while pad 19 may output signals from circuitry 13.

The microstructure 11 senses vibrations in a plane parallel to the surface of the substrate 12 on which the microstructure 11 is mounted as indicated by the double-headed arrow 28. In operation, chip 11, or a larger structure in which it may be incorporated, is rigidly mounted on a rotating machine or other type of cyclically operating device. Machine vibrations produced by rotating bearings, gears, and the like, cause the microstructure 11 to vibrate and the beam 14 to deflect such that the free end 21 moves in the region between the walls 22, 23. The free end 21 will be deflected towards the walls 22, 23, by an amount no greater than the width of the gaps 25, for those vibrations that cause accelerations of the microstructure 11 in a plane parallel to the surface of the substrate 12 on which the microstructure 11 is mounted and perpendicular to the longitudinal axis of the beam 14, as indicated by arrow 28. The amount of the beam 14 deflection experienced as a result of a vibrating source will depend on the natural vibrating frequency of the beam 14, the frequency of the source and the magnitude of the source vibrations. Therefore, the natural frequency of the beam 14 and the size of the gap 25 may be chosen such that the free end 21 of beam 14 will make contact with the walls 22, 23 only when some predetermined machine vibration exists. For example, gap 25 and the stiffness of beam 14 may be chosen such that when the amplitude of the machine vibrations reaches a predetermined level, the free end 21 will make contact with the walls 22, 23, completing a circuit between conductive strips 26, 27. The control circuitry 13 will contain conventional frequency detector circuits for sensing the currents in the strips 26, 27 and produce an appropriate output via pad 19. A warning device (not shown) may be connected to the circuit 13, via pad 19, to energize an alarm to indicate that a vibration of a particular magnitude has been detected.

Alternatively, the natural resonant frequency of the beam 14 may be such that under normal machine operation there is a mismatch between the frequency of vibration of the machine and the natural resonant frequency of beam 14. Also, the gap size 25 may be chosen to be of a sufficient size so that the free end 21 does not contact the walls 22, 23 under normal machine operation. However, if machine vibrations or harmonics of sufficient magnitude develop that match the natural frequency of beam 14, the beam 14 will be deflected across gap 25 to cause contact between the free end 21 and the walls 22, 23. The circuitry 13 will detect currents in strips 26, 27 and provide an appropriate output on pad 19.

Still another possibility is to have the beam 14 designed to have a natural frequency that matches the operating frequency of the machine being monitored. In this case, the beam 14 vibrates sufficiently to deflect end 21 across gap 25 to make contact with walls 22, 23. This condition is detected by circuitry 13 and appropriately outputted on pad 19 to indicate normal operation. If, however, the machine should develop a fault, a number of different situations are possible. For one, the amplitude of the normal machine vibrations could increase. This condition could be detected by employing a second resonator similar to the first resonator but having a larger gap 25 so that there would be no output from the second resonator when the vibrations are normal but an output would exist when a fault occurs that causes the magnitude of the vibrations to increase appreciably. Another result could occur when the fault has no effect on the normal machine vibrations but does add one or more additional vibration components. This condition could be detected by employing a plurality of resonators each having a slightly different natural resonant frequency that together span a spectrum of frequencies to be monitored. Only those resonators corresponding to the new vibrations caused by the fault will produce an output. Still a further condition is possible wherein the normal operating frequency of the machine shifts to a new value. In this case, the natural frequency of the beam 14 will no longer match the source frequency, causing the vibrations to be damped and the free end 21 to no longer contact the walls 22, 23. Again, these conditions will be detected by circuitry 13 and outputted appropriately via pad 19.

Figure 3:
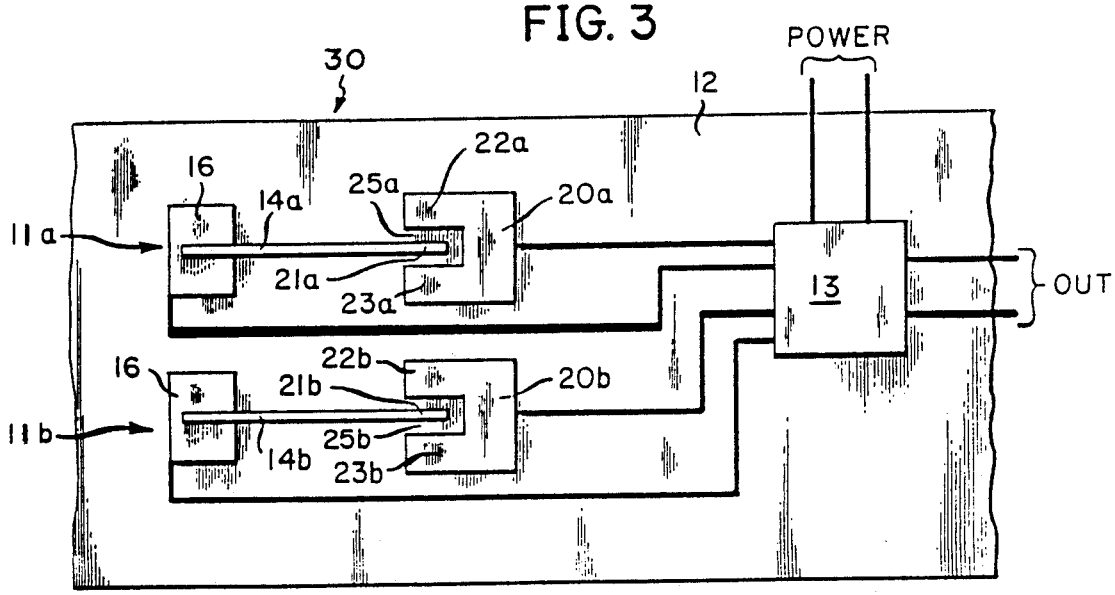
FIG. 3 is a top view of a system employing the embodiment of FIGS. 1 and 2.

FIG. 3 illustrates a system 30 having a plurality of resonant microstructures 11a, 11b mounted on a common substrate 12. Microstructures 11a, 11b are each similar to the parallel microstructures 11 in FIGS. 1, 2. In this case, the system 30 may monitor the occurrence of a plurality of different combinations of vibrating situations. For example, the gap 25a may be made larger than the gap 25b so that the occurrence of vibrations at several thresholds may be monitored. If both microstructures 11a, 11b have the same natural frequency but different gap sizes for gaps 25a, 25b, different magnitudes of vibration at a common frequency may be distinguished. On the other hand, if the natural frequencies of the microstructures 11a, 11b are different, the vibrations at several frequencies may be detected. The circuitry 13 in this case includes conventional logic gates for providing a digitally encoded output indicative of the detected vibrations.

Figure 4:
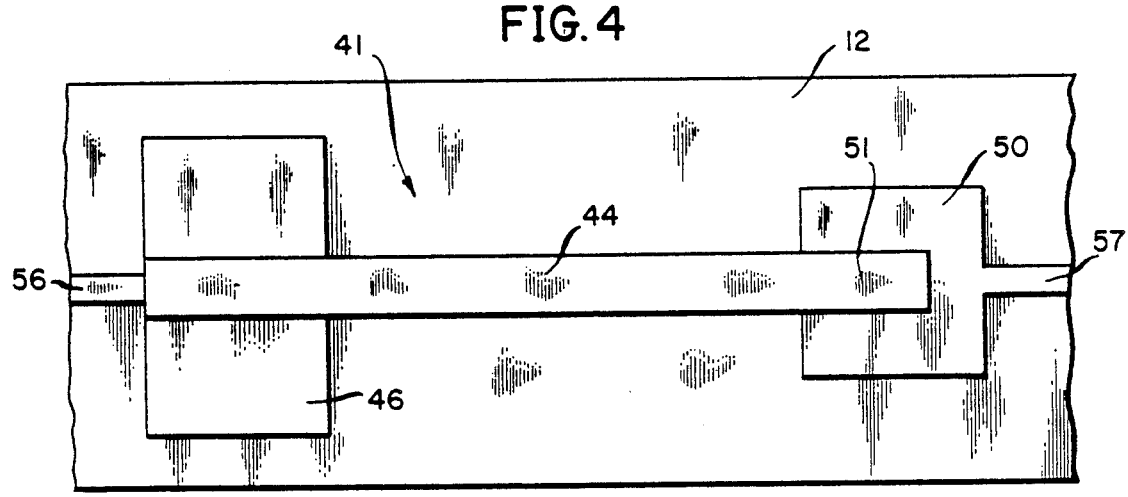
FIG. 4 is a top view of a second preferred embodiment.
Figure 5:
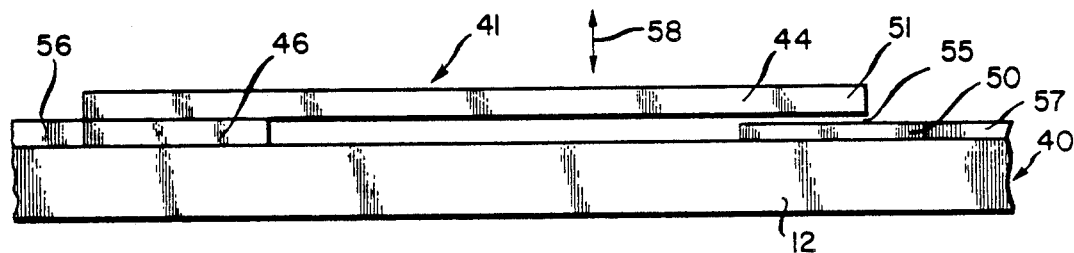
FIG. 5 is a side view of the device shown in FIG. 4.

FIGS. 4 and 5 illustrate a chip 40 having an insulating substrate 12 on which is mounted a perpendicular resonant microstructure 41. In this case, microstructure 41 will detect vibration components perpendicular to the surface of the substrate 12 as indicated by the double-headed arrow 58 (FIG. 5). The conductive beam 44 is fixed at one end to a conductive contact 46 deposited onto the surface of substrate 12. The free end 51 of beam 44 is spaced above a conductive contact 50 also deposited on the surface of substrate 12 to form gap 55. Contacts 46, 50 are connected to conductive strips 56, 57, respectively, for completing a connection to a control circuitry (not shown) deposited elsewhere on substrate 12.

The microstructure 41 will operate in a fashion similar to that of microstructure 11 of FIGS. 1, 2. In this case, however, the beam 44 will detect vibrations in only a perpendicular direction as indicated by arrow 58.

Figure 6:
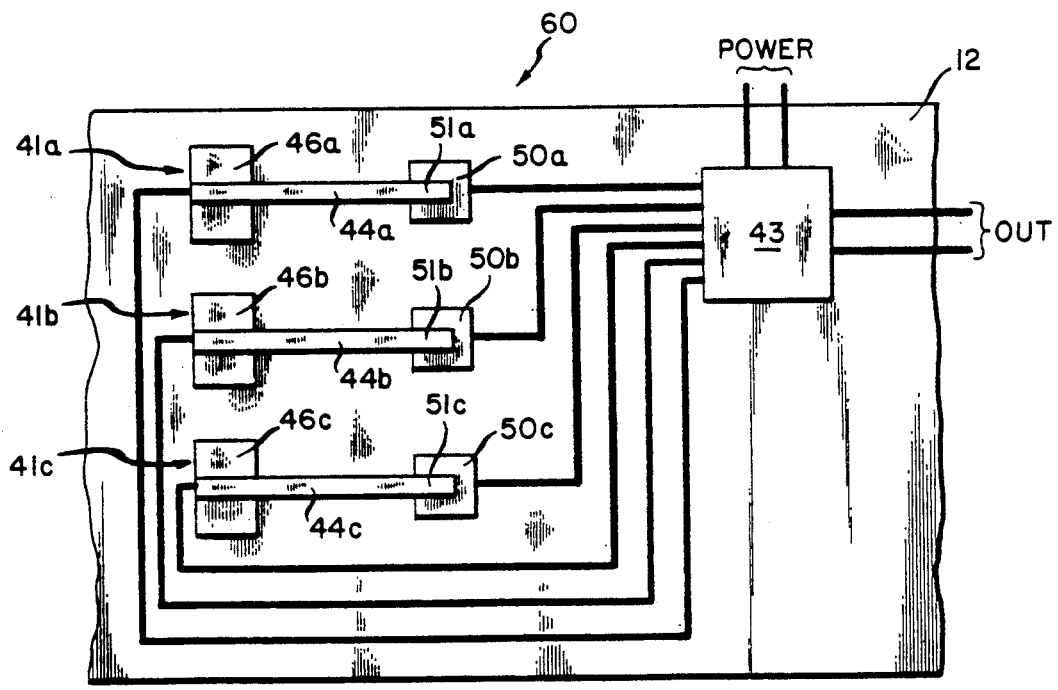
FIG. 6 is a top view of a system employing the embodiment of FIGS. 4 and 5.

As seen in FIG. 6, a plurality of microstructures 41a, 41b, 41c, mounted on a single substrate 12 to form a system 60, may monitor a multiple combination of amplitude or frequency thresholds. The circuitry 43, connected between each of the contacts 46a, 46b, 46c and 50a, 50b, 50c, will include conventional logic elements and frequency detectors for providing an output indicative of the vibrating state of beams 44a, 44b, 44c.

Obviously, many other modifications and variations of the present invention are possible in the light of the above teachings. For instance, it is also contemplated that a single chip could include multiple perpendicular and parallel resonant microstructures mounted in three orthogonal planes to obtain information about the resultant direction of the source vibrations. It is therefore to be understood, that within the scope of the appended claims, the invention may be practiced by those skilled in these arts in a manner otherwise than as specifically described.

What is claimed is:

1. A micromechanical vibration sensor comprising:
   an insulating substrate;
   a mechanical resonator mounted on said substrate having a moveable electrical conductor capable of vibrating at a natural resonant frequency;
   an electrical contact mounted adjacent said moveable electrical conductor to form a gap; and
   circuit means connected to said moveable conductor and said contact for sensing the presence and absences of currents in said conductor caused by the opening and closing of said gap;
   said moveable electrical conductor is a cantilevered beam having a fixed end and a free end spaced above said substrate;
   said electrical contact includes a U-shaped wall mounted on the surface of said substrate having portions extending on either side of said free end.

2. The sensor of claim 1 wherein said circuit means is mounted on said substrate and includes conductors connected to said fixed end and to said electrical contact.

3. A system of micromechanical vibration sensors comprising:
   an insulating substrate;
   a plurality of mechanical resonators mounted on said substrate each having a moveable electrical conductor capable of vibrating at a natural resonant frequency;
   a plurality of electrical contacts each mounted adjacent a different one of said moveable electrical conductors to form gaps; and
   circuit means connected to said moveable conductors and said contacts for sensing the presence and absence of currents upon the opening and closing of said gaps;
   at least two of said gaps are of different sizes for detecting the occurrence of vibrations at different thresholds.

4. A system of micromechanical vibration sensors comprising:
   an insulating substrate;
   a plurality of mechanical resonators mounted on said substrate each having a moveable electrical conductor capable of vibrating at a natural resonant frequency;
   a plurality of electrical contacts each mounted adjacent a different one of said moveable electrical conductors to form gaps; and
   circuit means connected to said moveable conductors and said contacts for sensing the presence and absence of currents upon the opening and closing of said gaps;
   said moveable electrical conductors are cantilevered beams each having a fixed end and a free end spaced above said substrate;
   said electrical contacts each include a U-shaped wall mounted on the surface of said substrate with each of said moveable electrical conductors having a said U-shaped wall extending on either side of said free end of each said conductor.

5. The system of claim 4 wherein said circuit means is mounted on said substrate and includes conductors connected to said fixed ends and to said electrical contacts.

* * * * *